June 11, 1946.  F. G. PURINTON  2,402,079
REINFORCED PLASTIC BUTTON
Filed March 18, 1944
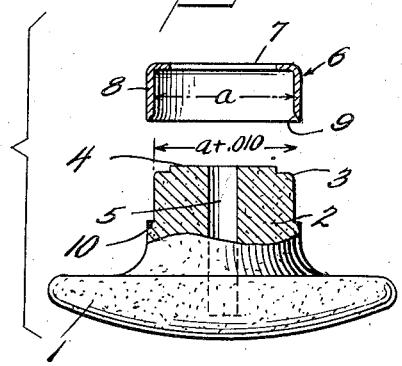
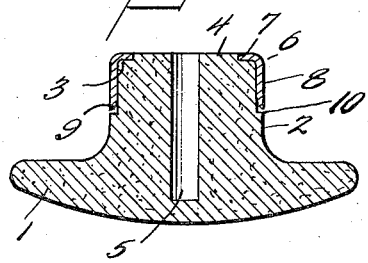
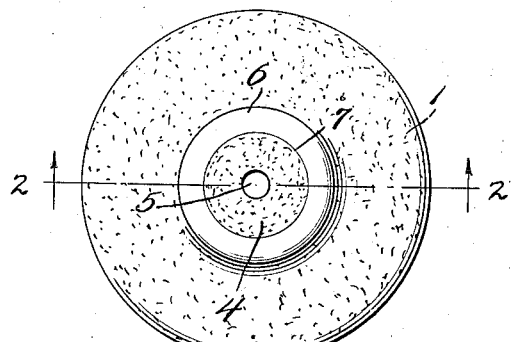
Inventor
Forrest G. Purinton
By Parker Cook
Attorney Patented June 11, 1946

2,402,079

UNITED STATES PATENT OFFICE 2,402,079

REINFORCED PLASTIC BUTTON

Forrest G. Purinton, Waterbury, Conn., assignor to The Patent Button Company, Waterbury, Conn., a corporation of Connecticut Application March 18, 1944, Serial No. 527,107

1 Claim. (Cl. 24—90)

My invention relates to new and useful improvements in reinforced plastic buttons and has for an object to provide a plastic button having an integral hub on which there is to be forced a metal ferrule to thus provide additional strength for the hub.

Another object of the invention is to provide a plastic button having an integral hub, the free end of which is arranged to receive a metal ferrule whose inside diameter is less than the outside diameter of the free end of the hub, thus necessitating considerable pressure on the ferrule in the attaching operation. However, the buttons will be fed down from one hopper of an attaching machine to an anvil and the ferrules from another hopper and then the ferrule pressed over the end of the hub by a descending plunger so that when the ferrule is once in position, there will be no possibility of it becoming accidentally disengaged from its hub.

Still another object of the invention is to provide a plastic button on the hub of which there is forcibly pressed a metal ferrule which has a relatively large aperture in what would otherwise be its closed face, while the walls about the aperture will encircle a slight projection formed on the end of the hub. Thus, after the ferrule is once forced in place, there is no possibility of the same working loose from its hub during packaging, shipment, or when the button is fed through the cup, chute, and escapement of the attaching machine.

Still another object of the invention is to provide a plastic button having an integral hub on the free end of which is a seat to receive a metal ferrule while just beyond the free end of the ferrule the diameter of the hub is slightly increased so that the external diameter of the hub will be the same as the external diameter of the ferrule. Thus the hub and ferrule will present a smooth surface to the touch. This ferrule when once pressed into position, will prevent the hub from fracturing during the button attaching operation.

Still another object of the invention is to provide a plastic button on which there is to be pressed, after the button is molded, a metal ferrule that will greatly strengthen the hub of the button and will not become accidentally disengaged from the hub or in any way interfere with the tack fastener when the same is driven within the bore of the button.

With these and other objects in view, the invention consists of certain new and novel arrangements and combination of parts as will be hereinafter more fully described and pointed out in the claims.

Referring now to the drawing showing a preferred embodiment:

Fig. 1 is a side elevation on an enlarged scale of my improved button, part of the hub being broken away for a clearness of illustration, the ferrule being shown in section and just before being pressed on to the hub;

Fig. 2 is a sectional view taken on line 2—2 of Fig. 3 of the button with the ferrule, as having been forced into position; and Fig. 3 is a bottom plan view of the button, also showing the ferrule in position.

Referring now to the drawing and for the moment to Fig. 1, there is shown a plastic button 1 together with the integral hub 2.

In molding the button, it will be seen that the outer periphery of the hub at its free end is provided with a fillet 3, or, in other words, the edge is slightly rounded.

There will also be seen the slight projection 4 so that, as will be shortly mentioned, when the ferrule is pressed into place, the outer surface (top face) of the projection (Fig. 1) will lie flush with the outer or top face of the ferrule.

Centrally of the hub, there is provided the bore 5, in which there will be driven a fluted shank tack fastener (not shown) when the button is attached to its cloth.

Still referring to Fig. 1, there may be seen the metal ferrule 6, which is provided with the central aperture 7. There may also be seen a circular side wall 8 while the metal at the mouth of the ferrule is slightly bevelled on its inner edge as at 9.

Referring to Figs. 1 and 2, it will be seen that there is also a shoulder 10 on the hub 2. It is to be noted that this shoulder terminates in practice several thousandths of an inch from the free end of the ferrule when the ferrule is in place.

This clearance is provided so that when the ferrule is forced in place the ferrule will be properly fitted on its seat at the free end of the hub, and the few thousandths clearance between the junction of the edge of the ferrule and the shoulder 10 on the hub will thus allow for any possible variation in the height of the cup from which the ferrule is made.

The inside diameter of the metal ferrule is designated by the letter $a$ and the outside diameter of the hub is then represented by the notation "$a$ plus .010" (ten thousandths).

It will be appreciated that the several views are on an enlarged scale and in an ordinary size button the diameter of the hub at the free end would be substantially .293 (two hundred ninety-three thousandths), while the inside diameter of the ferrule would be .283 (two hundred eighty-three thousandths). In other words, the outside diameter of the hub at its free end is ten thousandths greater than the inside diameter of the ferrule. Of course, if the button were larger or smaller, these last named values would be changed accordingly.

The diameter across the projection 4 is slightly less than the diameter of the aperture in the ferrule so that when the ferrule is driven into place the defining walls about the aperture 7 will easily pass through said aperture and allow for any variation in concentricity of said aperture.

It will also be seen from Fig. 2 that when the ferrule is forced on its seat the outer face of the ferrule should be substantially flush with the outer face of the projection on the hub.

By providing a drive fit, the ferrule tightly grips the hub and places the material that is within the ferrule, under compression.

It is also to be noticed that there is a relatively large aperture in what would otherwise be the closed face (top face Fig. 1) of the ferrule, through which extends the projection on the hub, which also thus provides a maximum length of plastic bore for contact with the fluted shank tack or fastener (not shown), thereby providing a maximum gripping area.

Again, the fluted shank fastener (not shown), when being driven into the bore, never comes in contact with the metal ferrule so there is no danger of the flutes on the tack fastener becoming dulled on their entrance into the bore.

As heretofore mentioned, it is necessary to provide the fillet on the hub at the beginning of the seat for the ferrule, and it is likewise necessary that the mouth edge of the ferrule be tapered or bevelled as at 9. I have found that if this fillet is not provided and a square corner is provided, that when driving the ferrule into position the hub was weakened at this point and that when the buttons were tested in a demolition machine they fractured right across the hub at this shoulder.

I have also found that unless the inner edge of the mouth of the ferrule is rounded, even though the fillet under the shoulder was used the square sharp edge on the inside of the mouth of the ferrule, when forced over the hub, would weaken the hub at this point and wholly undo the strengthening effect of the fillet. Therefore, it is necessary that the inner edge of the mouth of the ferrule be rounded and that there be a fillet at the beginning of the seat on the hub.

As heretofore mentioned, it is a simple matter to expand and force the ferrules into place as the ferrules may be placed in a suitable attaching machine (not shown) and the ferrules fed from one hopper and the buttons with the hubs in an upright position fed from another hopper so that after a ferrule is in a registered position directly over the hub a plunger will descend and drive the ferrule tightly into position.

It might be mentioned that in the button attaching operation (distinguished from the attaching of the ferrule), the crucial time is when the prong of the tack fastener (not shown) first starts to enter the bore of the button, as here again the outside diameter of the tack prong is generally several thousandths greater than the internal diameter of the bore, but I have found that by forcing the ferrule, as above described, on to the seated hub, the material of the hub being under compression will easily withstand the button attaching operation and the chance of fracture is very small.

I have also found that a button constructed as shown, and having this ferrule fitted thereon, will also withstand a far greater strain in a destructive test, that is, determining under what poundage the button will fracture when trying to pull the fastener from within the bore, than a button without this form of ferrule. In fact, the average, after a good many tests, shows that the button would withstand a pull of around 221 pounds, which is much greater than necessary for a plastic button of this type and substantially 50 pounds greater than the same button with other forms of ferrule thereon.

However, of greater importance is the relatively high minimum strength of buttons constructed in this way. I have found that the minimum strength is around 170 lbs. while buttons having other forms of ferrules, tested in the same manner, were broken down under a 90 pound strain, thus giving an increase in the minimum strength of 80 pounds for this pressed-on ferrule.

From the foregoing it will be seen that I have provided a plastic button having a certain form of seat on which there is to be driven a certain form of ferrule and which button, with its ferrule thereon, will be efficient in service and will not fracture during the button attaching operation. Again, by providing the hub with what might be termed two diameters, the outer side walls of the ferrule will lie flush with the outer side walls of the hub thereby presenting a neat and finished appearance to the reinforced hub.

Finally, after the reinforced button is once attached, it will withstand all the ordinary strains to which it is likely to be subjected.

Having thus described my invention what I claim is new and desire to secure by Letters Patent is:

A plastic button of the tack type having an integral hub provided with a central bore to receive the tack fastener, a projection formed on the free end of the hub, a ferrule having a central aperture in what would otherwise be its closed face, the diameter of the aperture being slightly greater than the diameter across the free end of the projection, the normal internal diameter of the ferrule being slightly less than the external diameter of the hub, the said ferrule tightly fitted on said seat and the outer end of said projection extending through the said aperture in said ferrule and lying substantially flush with the outer face of said ferrule, the outer edge of the seat provided with a fillet, the inner edge of the ferrule being slightly rounded, and that part of the plastic that extends within the ferrule being held under compression to thus assist in preventing fracture of the plastic button when the tack fastener is driven in said bore.

FORREST G. PURINTON.